United States Patent [19]

Jahn

[11] 4,177,319
[45] Dec. 4, 1979

[54] GLASS FOR THE PRODUCTION OF OPTICAL ELEMENTS WITH REFRACTIVE INDEX GRADIENTS

[75] Inventor: Walter Jahn, Ingelheim, Fed. Rep. of Germany

[73] Assignee: JENAer Glaswerk Schott & Gen., Mainz, Fed. Rep. of Germany

[21] Appl. No.: 958,376

[22] Filed: Nov. 7, 1978

[30] Foreign Application Priority Data

Nov. 7, 1977 [DE] Fed. Rep. of Germany ....... 2749683

[51] Int. Cl.² .................... C03C 21/00; C03C 3/04
[52] U.S. Cl. .................... 428/410; 106/47 Q; 106/52; 106/53; 106/54
[58] Field of Search ............. 106/52, 47 Q, 54, 53; 428/410; 65/30 E

[56] References Cited

U.S. PATENT DOCUMENTS

| | | | |
|---|---|---|---|
| 3,357,876 | 12/1967 | Rinehart | 106/52 |
| 3,428,513 | 2/1969 | Denman | 428/410 |
| 3,464,806 | 9/1969 | Seki et al. | 106/52 |
| 3,464,880 | 9/1969 | Rinehart | 428/410 |
| 3,790,430 | 2/1974 | Mochel | 106/52 |
| 3,959,000 | 5/1976 | Nakagawa et al. | 106/52 |

*Primary Examiner*—O. R. Vertiz
*Assistant Examiner*—Mark Bell
*Attorney, Agent, or Firm*—Haight & Huard

[57] ABSTRACT

An optical quality glass composition suitable for the production of optical elements with a refractive index gradient delta n of at least $100 \times 10^{-4}$ by utilizing an ion exchange, consisting essentially of the following synthesis composition, in % by weight:

| | |
|---|---|
| $SiO_2$ | 56–78 |
| $MgO$ | 6–15 |
| $Li_2O$ | 5–14 |
| $Na_2O$ | 3–14 |
| $K_2O$ | 0– 9 | wherein the total of $MgO$ plus $Li_2O$ is 12–23.

6 Claims, No Drawings

GLASS FOR THE PRODUCTION OF OPTICAL ELEMENTS WITH REFRACTIVE INDEX GRADIENTS

BACKGROUND OF THE INVENTION

The invention relates to a vitreous material in which an especially steep refractive index gradient can be produced by means of an ion exchange process, e.g. a salt bath.

As is known, glasses of this type may be utilized for optical systems in which the refractive deflection of a light beam is not (or not exclusively) produced by any curved surfaces but instead is produced by the medium itself. The material may be utilized in the form of rods and disks, as well as in the usual lens form.

The use of ion exchange processes in order to change physical properties of glasses has been known and their theoretical prerequisites and the performance of the exchange processes have been described before, e.g. compare E. W. Marchand: Gradient Index Lenses; E. Wolf: Progress in Optics XI, North Holland 1973, pp. 306-337; W. G. French, A. D. Pearson: Amer. Ceram. Soc. Bull. 49:974-977 (1970); H. Kita, T. Uchida: Laser and Applied Ray Technology 2:39-41 (1971); DT-OS No. 24 56 894; and U.S. Pat. No. 3,873,408.

A refractive index gradient produced by an ionic exchange is influenced to a great degree by those ions involved in the interchange; relative to monovalent ions, both the atomic numbers in the Periodic System of Elements and the ion radii are of decisive influence. Accordingly, copper ions, silver ions and, to an even greater degree, thallium ions result, to give an example, in the highest refractive index gradients when used as elements or partners in the exchange process. Unfortunately, $Cu^+$ ions nd $Ag^+$ ions tend to cause discolorations or cloudiness in the glass while thallium salts are highly poisonous and require extensive protective measures.

It has been suggested that bivalent ions be used as elements in the exchanges. However, the diffusion constants are smaller by several orders of magnitude than those of monovalent ions, relative to the same or similar basic glasses. Hence, for suitable exchange temperatures (in the vicinity of the Tg-area of glasses) a noticible diffusion, with acceptable diffusion times (20-200 h), can exist only in the micrometer range, i.e. within a very thin surface skin.

Therefore it would be expected that, for example, bivalent ions would have no, or only a slight, effect on the production of a refractive index gradient. Surprisingly, it has now been found that certain bivalent ions have a considerable influence on the size of a refractive index gradient which has been produced by the diffusion of monovalent ions, e.g. alkali ions. The influence of these system-altering ions, which may differ in accordance with their different ion radii, is of a secondary nature since there is no, or only an inconsequential, change in their own concentration in the area of diffusion. The observed effects on the refractive index gradients produced apparently resulted from altered structural properties of the glass. While not wishing to be bound by any theory of the invention, it is presently believed that the addition of oxides of bivalent elements, in particular the alkaline earths, to silicate glasses may have unexpected effects on the diffusion properties of the alkali ions which are basically responsible for the creation of the refractive index gradient.

For the purpose of creating refractive index gradients in glasses, the preferred glasses have heretofore been the conventional aluminum silicate glasses and boron silicate glasses, which usually contain only relatively small amounts of alkaline earth oxide (usually as calcium oxide) in addition to the alkaline oxides in order to stabilize the glass. For example, definite refractive index gradients can be achieved with these glasses which contain a few percent of $Li_2O$, by means of a sodium salt bath and diffusion exchange. In the case of a glass rod with a diameter of 2 mm, this gradient between the rod axis and the periphery, when measured at the $n_d$-line, generally amounts to a maximum of approximately delta $n = 70$–$80 \times 10^4$ with a 48 hour exchange period and a bath temperature of 530° C. When the exchange period is shortened to 24 hours, the delta n-value is lower. When the exchange period is extended to 192 hours, the refractive index gradient is lower, as well. The maximum gradient obtainable depends on the rod diameter. As the diameter gets smaller, the gradient which can be obtained with the same composition of the glass gets smaller. This is quite understandable, in view of the fact that the diffusion quickly penetrates to the rod axis in rods with small radii while the maximum exchange has not yet taken place on the periphery. As the radius of the rod becomes larger, higher delta n-values can be obained. However, if the radius of the glass rod becomes greater than the depth to which the exchange ions can penetrate, it is no longer possible to achieve an approximation of a preferred gradient profile, e.g., a parabola of the second order.

OBJECTS OF THE INVENTION

Accordingly, it is a general object of the present invention to provide new glasses which are suitable for the production of optical elements with relatively high refractive index gradients of at least $100 \times 10^{-4}$ by means of ion exchange.

Another object of the present invention is to provide such glasses which are suitable for the protection of optical elements having a particularly high refractive index gradient delta n of at least $200 \times 10^{-4}$.

A further object of the present invention is to provide optical elements having the aforementioned refractive index gradients prepared by ion exchange of exchangeable ions therein with sodium ions.

Other objects, features and advantages of the present invention will become more fully apparent to those skilled in the art to which the invention pertains from the following specification and claims.

SUMMARY OF THE INVENTION

Briefly, the above and other objects, features and advantages of the present invention are attained in one aspect thereof by providing an optical quality glass composition suitable for the production of optical elements with a refractive index gradient delta n of at least $100 \times 10^{-4}$ by utilizing an ion exchange, consisting essentially of the following synthesis composition, in % by weight:

| | |
|---|---|
| $SiO_2$ | 56-78 |
| MgO | 6-15 |
| $Li_2O$ | 5-14 |
| $Na_2O$ | 3-14 |

-continued

| | |
|---|---|
| K₂O | 0–9 | wherein the total of MgO plus Li₂O is 12–23.

DETAILED DESCRIPTION

Surprisingly, it has been found in accordance with the present invention that the refractive index gradient can be increased to a multiple for a rod diameter of, e.g. 2 mm, in the presence of the same elements for the ion exchange ($Li^+$, $Na^+$ and $K^+$ ions), if glasses are used which have the following synthesis composition.

Particularly high refractive index gradients may be obtained with glasses of the following compositions (in % by weight):

| | | |
|---|---|---|
| SiO₂ | 65–75 | |
| MgO | 9–13 | total |
| | | MgO + Li₂O |
| Li₂O | 8–12 | 16–22 |
| Na₂O | 4–10 | |
| K₂O | 0–8 | |

As much as 18% by weight of SiO₂ can be replaced in these glasses by Al₂O₃ without any negative influence on the level of the refractive index gradient. Greater exchanges with Al₂O₃ are possible, although the glasses require higher fusing temperatures.

The most important components of these glasses, which are decisive for favorable gradient properties, are MgO + Li₂O, which combined should amount to about 12–23% by weight, preferably 16–22% by weight.

Moreover, the glasses of the present invention may contain the usual stabilizing additives. Suitable additives are well known in the art and include but are not limited to 1–6% by weight of at least one of the following, in percent by weight:

| | |
|---|---|
| B₂O₃ | 0–5 |
| PbO | 0–5 |
| CaO | 0–6 |
| SrO | 0–6 |
| BaO | 0–6 |
| La₂O₃ | 0–3 |
| ZrO₂ | 0–3 |
| Ta₂O₅ | 0–2 |
| WO₃ | 0–2 |
| TiO₂ | 0–2 |

The total amount of stabilizing additives present in a glass composition is generally less than 6%, preferably less than 5% by weight and generally at least 0.7% by weight.

The creation of a high refractive index gradient of delta $n = 100 \times 10^{-4}$, and greater, in reference to a glass rod of 2 mm diameter, is not adversely influenced by the additives mentioned above which help, for example, to improve the chemical resistance through stabilization, to reduce susceptibility to crystallization and to correct and change the optical position.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. All temperatures are set forth uncorrected in degrees Celsius; unless otherwise indicated, all pressures are ambient and all parts and percentages are by weight.

EXAMPLE 1

295.6 g. of SiO₂, 41.6 g. of MgO (as carbonate), 44.4 g. of Li₂O (as carbonate), 18.4 g. of Na₂O (as carbonate) and 1.2 g. of As₂O₃, as purifier, are placed into a platinum crucible in an electric furnace at 1500° C., melted down and then maintained at this temperature for 30 minutes. The mixture is then purified for 40 minutes at 1520° C. and subsequently stirred for 15 minutes while the melting temperature is reduced to 1380° C. After the crucible has been removed from the furnace, the molten mass is poured into a pre-heated iron form and cooled to ambient temperature in the course of 20 hours. Glass rods with a 2 mm diameter are drilled from the glass block by means of a hollow drill. After finish grinding, these rods are cleaned in an ultrasonic bath and then subjected to ion exchange in a sodium salt bath composed of 90% by weight of NaNO₃ and 10% by weight of NaCl for 24 hours at a temperature of 480° C.

The refractive index gradient between the rod axis and periphery was measured as delta $n = 158 \times 10^{-4}$.

EXAMPLES 2–10

Following the general procedure of Example 1 with the variations therefrom indicated below, nine additional glass compositions were prepared.

The following table shows a representative selection of glasses in accordance with the present invention, as well as data relating to the temperature of exchange, the period of exchange and the refractive index gradient. The temperatures and periods of exchange are variable and can be used to influence the progression of the gradient and the delta n. Purifiers, e.g. 0.3–0.5% of As₂O₃, may be added to the glasses in the usual manner.

TABLE

| | 1 | 2 | 3 | 4 | 5 | 6 | 7 | 8 | 9 | 10 |
|---|---|---|---|---|---|---|---|---|---|---|
| SiO₂ | 70.5 | 70.7 | 73.5 | 73.9 | 65.0 | 56.2 | 65.3 | 71.2 | 73.5 | 73.5 |
| MgO | 9.9 | 9.5 | 11.0 | 10.4 | 6.5 | 12.4 | 6.3 | 7.3 | 11.0 | 6.5 |
| Li₂O | 6.4 | 10.6 | 10.0 | 11.1 | 8.0 | 9.0 | 7.5 | 5.4 | 9.0 | 10.0 |
| Na₂O | 13.2 | 8.8 | 5.0 | 4.6 | 8.2 | 6.2 | 8.4 | 12.0 | — | 5.0 |
| K₂O | — | — | — | — | — | — | — | — | 6.0 | — |
| Al₂O₃ | — | — | — | — | 8.2 | 16.2 | 8.5 | 2.1 | — | — |
| B₂O₃ | — | — | — | — | — | — | — | 2.0 | — | — |
| ZrO₂ | — | — | — | — | 0.7 | — | 0.7 | — | — | — |
| CaO | — | — | — | — | — | — | — | — | — | 5.0 |
| BaO | — | — | — | — | 0.4 | — | 0.3 | — | — | — |
| PbO | — | — | — | — | 3.0 | — | 3.0 | — | — | — |
| As₂O₃ | — | 0.4 | 0.5 | — | — | — | — | — | 0.5 | — |
| Rod | | | | | | | | | | |

TABLE-continued

|  | 1 | 2 | 3 | 4 | 5 | 6 | 7 | 8 | 9 | 10 |
|---|---|---|---|---|---|---|---|---|---|---|
| diameter in mm | 2 | 2 | 2 | 2 | 2 | 2 | 2 | 2 | 10 | 10 |
| Exchange temp. in °C. | 480 | 480 | 480 | 480 | 500 | 500 | 520 | 480 | 430 | 430 |
| Exchange time in h | 24 | 24 | 96 | 24 | 24 | 24 | 8 | 288 | 144 | 144 |
| delta n × $10^{-4}$ | 107 | 145 | 242 | 158 | 118 | 248 | 126 | 135 | 200 | 320 |

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

What is claimed is:

1. An optical quality glass composition suitable for the production of optical elements with a refractive index gradient delta n of at least $100 \times 10^{-4}$ by utilizing an ion exchange, consisting essentially of the following synthesis composition, in % by weight:

| $SiO_2$ | 56–78 |
|---|---|
| MgO | 6–15 |
| $Li_2O$ | 5–14 |
| $Na_2O$ | 3–14 |
| $K_2O$ | 0–9 | wherein the total of MgO plus $Li_2O$ is 12–23.

2. A glass composition according to claim 1, suitable for the production of a particularly high refractive index gradient delta n of at least $200 \times 10^{-4}$, consisting essentially of the following composition, in % by weight:

| $SiO_2$ | 65–75 |
|---|---|
| MgO | 9–13 |
| $Li_2O$ | 8–12 |
| $Na_2O$ | 4–10 |
| $K_2O$ | 0–8 | wherein the total of MgO plus $Li_2O$ is 16–22.

3. A glass composition according to claim 1, wherein up to 18% by weight of $SiO_2$ has been replaced by $Al_2O_3$.

4. A glass composition according to claim 2, wherein up to 18% by weight of $SiO_2$ has been replaced by $Al_2O_3$.

5. A glass composition according to any one of claim 1, 2, 3, or 4 which further contains a stabilizing amount of about 1–6% by weight of at least one of the following oxides is a stabilizing additive:

| $B_2O_3$ | 0–5 |
|---|---|
| PbO | 0–5 |
| CaO | 0–6 |
| SrO | 0–6 |
| BaO | 0–6 |
| $La_2O_3$ | 0–3 |
| $ZrO_2$ | 0–3 |
| $Ta_2O_5$ | 0–2 |
| $WO_3$ | 0–2 |
| $TiO_2$ | 0–2 |

6. An optical glass having a refractive index gradient of at least $100 \times 10^{-4}$ produced by the ion exchange of a composition according to claim 1 with a molten inorganic sodium salt for a time and at a temperature sufficient to achieve said refractive index gradient.

* * * * *